May 21, 1968     H. H. GREGER     3,383,737
APPARATUS FOR PRESSURE SINTERING CERAMIC MATERIAL
Original Filed Dec. 8, 1964     2 Sheets-Sheet 1
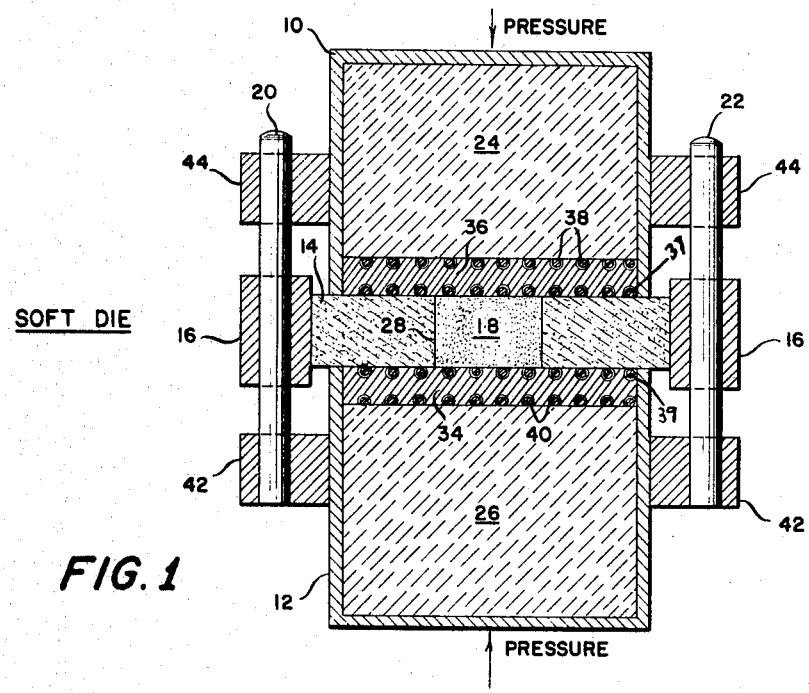
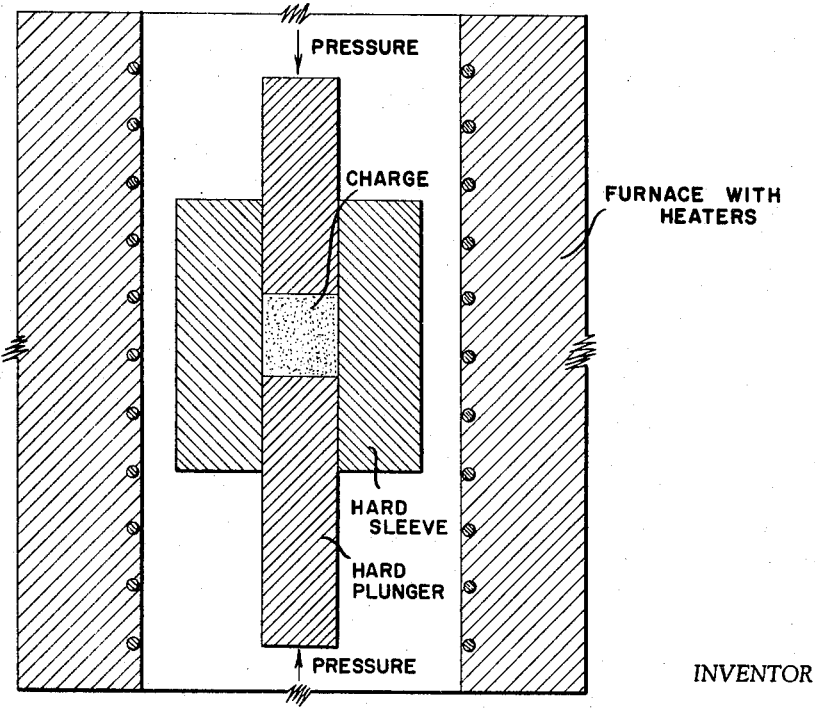
INVENTOR
HERBERT H. GREGER
BY Semmes & Semmes
ATTORNEYS May 21, 1968     H. H. GREGER     3,383,737
APPARATUS FOR PRESSURE SINTERING CERAMIC MATERIAL
Original Filed Dec. 8, 1964     2 Sheets-Sheet 2

FIG. 3

EXAMPLES OF SOFT DIE SLEEVE MATERIALS, PROPERTIES AND USEFUL RANGE

| COMPOSITION | Clay & Lime | Clay & Lime | Clay & Lime | Clay | Kaolin | Bubble Alumina | Foamed Zirconia | Foamed Olivine or Fosterite |
|---|---|---|---|---|---|---|---|---|
| Porosity* percent | 87 | 83 | 81 | 73** | 72** | 63 | 49 | 80 |
| Specific Gravity grams/cb cm | 0.35 | 0.466 | 0.506 | 0.712 | 0.74 | 0.737 | 2.7 | 0.66 |
| Hot Pressed Density | 2.69 | 2.74 | 2.66 | 2.64 | 2.64 | 3.4 | 5.5 | 3.3 |
| Temperature Limit °C | 1350 | 1350 | 1450 | 1500 | 1600 | 1600 | 1600 | 1500 |
| Fusion Temperature Approximate °C | 1500 | 1500 | 1500 | 1700 | 1750 | 1850 | 2600 | 1700 |
| Cold Deformation* psi | 70 | 110 | 145 | 195 | 190 | 900 | 1300 | 100 |

*May be adjusted by drilling holes
**May be as low as 50%

INVENTOR
HERBERT H. GREGER
BY Semmes & Semmes
ATTORNEYS

United States Patent Office 3,383,737
Patented May 21, 1968

3,383,737
APPARATUS FOR PRESSURE SINTERING
CERAMIC MATERIAL
Herbert H. Greger, 9901 Glen Road,
Rockville, Md. 20854
Continuation of application Ser. No. 416,774, Dec. 8, 1964, which is a continuation-in-part of application Ser. No. 173,452, Feb. 15, 1962. This application May 5, 1966, Ser. No. 548,016
8 Claims. (Cl. 18—16.5)

This application is a continuation of my copending application Ser. No. 416,774, filed Dec. 8, 1964, now abandoned, which is a continuation-in-part of my copending application Ser. No. 173,452, filed Feb. 15, 1962, now abandoned.

This invention relates to a pressure sintered ceramic oxide composition. More specifically, this invention relates to an apparatus for soft-die pressure sintering of magnetic and dielectric, ceramic oxide and fluoride materials, including solid crystalline solutions.

It is generally known that mechanical and various electric or magnetic properties of ceramic polycrystalline materials are affected by their density, the presence or absence of pores, the grain or crystallite size, the grain boundaries and other factors. Control of these properties by conventional kiln firing is not always possible; for example, the simultaneous control over grain size of less than 10 microns and full density can be achieved only with difficulty and not satisfactorily. However, in hot pressing, according to the present method, pores can be eliminated completely by the application of external pressure. While grain size can be independently influenced by temperature and to a lesser extent by the time at temperature, other factors also affect the magnetic or dielectric properties, such as particle size of the raw material powder, its impurities and the composition of the atmosphere; but these factors can usually be controlled by conventional means.

Examples of hot pressed ceramic materials in commercial use include such items as pore free dielectrics for high voltage application, cutting tools of carbide or alumina, piezo-electric titanates of improved coupling factor. Boron nitride and fluor mica can be satisfactorily compacted only by hot pressing.

Hot pressing as practiced in this invention provides a simultaneous control over density and grain size of less than 10 microns in the end product. In a properly executed hot pressing operation full density can often be obtained without grain growth if the sintering temperature is kept low and the pressure high. It is evident that a high degree of control is needed to achieve consistently reproducible results in the ceramic oxide and it is the object of this invention to provide a suitable apparatus for sintering of ceramic oxides.

Additional objects of invention are:

(1) To provide a soft-wall, non entering die apparatus for pressure sintering of ceramic oxide materials at temperatures up to 1500° C. and pressure up to 15 tons per sq. inch.

(2) To provide a non-entering die apparatus of rigid, essentially non-elastic, ceramic soft-wall having an initial resistance to permanent deformation under pressure of less than 500 p.s.i.

(3) To provide a non-entering die apparatus of crushable ceramic soft-wall capable of permanent, unidirectional volume reduction of approximately 1:2 to 1:3 at ambient temperature and 1:4 to 5 at hot pressing temperature.

(4) To provide a ceramic non-entering die composed of rigid foam of ceramic oxide material, resisting pressure sintering temperatures without slaging or fusion in ranges of temperature maxima of 1300, 1400 or 1500° C.

(5) To provide a pressure sintering apparatus composed of two high temperature, high pressure heating platens, a soft-die wall and a metal shell, said die wall being reduced in volume by said platens on closing the die and application of pressure.

(6) To provide a pressure sintering apparatus wherein the temperature resisting soft-die wall is heated by the pressure platens, thus providing a maximum temperature uniformity of the charge.

(7) To provide a pressure sintering soft-die apparatus for the simultaneous control of density and grain size in metallic oxide compounds, ferrites, garnets, titanates, silicates, also including oxy-fluorine compounds and fluorides.

Yet, additional objects of invention will become apparent from the ensuing description and attached drawings wherein:

FIG. 1 is a vertical section of a proposed die apparatus for pressure sintering a ceramic oxide composition, according to the present invention.

FIG. 2 is a vertical section of a conventional die apparatus for pressure sintering.

FIG. 3 is a chart setting forth characteristics of soft-die compositions which may be utilized according to the present invention.

The design of the die is based on the principle of placing its ceramic parts in compression, avoiding tensile stresses in the ceramic parts and transmitting the tensile stresses to a steel shell comprised of plungers 10 and 12 which are exposed to air for cooling. It is well known that the tensile strength of brittle ceramic materials is considerably lower than their compressive strength, sometimes by a factor of 10. Devices that are based on ceramic working parts require the application of these design principles for reliable function of these parts and this is especially true under high temperature and pressure conditions as in this pressure sintering apparatus.

In ceramic dies for hot pressing, design for efficient and uniform transmission of heat is a further important requirement, because ceramic materials are generally poor conductors of heat and the rate of heat equalization is low. It is, therefore, not proper in the design of a hot pressing die to copy a metal "hard die" made for example, from a steel sleeve and two entering steel plungers, as illustrated in FIG. 2.

In FIG. 1 the two pressure transmitting plungers 10 and 12 are built as heating platens reciprocable upon guide pins 20 and 22 and the die sleeve 14 of ceramic foam is situated between them. A mullite refractory 24, 26 may be filled into each plunger. This die sleeve is held together by steel frame 16 to resist lateral pressures which develop during the pressing operation. The center of sleeve 14 has an opening 28, usually rectangular or circular in configuration, to receive charge 18. The dimensions of the die depend on the available pressure. If, for example, 150 tons are available and hot pressing requires 15 tons per square inch, opening or cavity 28 may be 2 x 5 inches. In a 600 ton press the cavity may be 4½ x 9 inches. Whatever the size of the desired sleeve opening 28 it is formed by a three inch wide frame of ceramic foam and as previously indicated, this is surrounded by steel frame 16. The platens 34 and 36 almost cover the whole area of the sleeve and compress and heat the same during the hot pressing operation. Heatings elements 38 and 40 are embedded in each platen. The above figures are, of course, subject to variation and are given here as examples.

For successful hot pressing the charge 18 must be more compact than the sleeve 14 so that when pressure is applied and charge 18 and sleeve 14 reduce in volume, the charge will bear most of the applied load.

Although charge 18 may be rammed into die cavity 28 from powder, a better compactness, free from laminations, is obtained by isostatically pressing charge 18 into a high density cake. The dimensions of the cake should be close to those of die cavity 28, for example, 2 x 2 x 5 inches. After hot pressing, the height may have changed to 1 inch, while width and length are slightly larger or essentially unchanged.

By contrast, in an entering hard die when made of ceramic material, heat has to travel through the sleeve and reaches the hot pressing charge at its peripheral surface which is often small compared to its face, such as in the case of a disc charge. This condition becomes aggravated as the size of the disc is increased. Non-conformity of heating becomes further aggravated by the poor heat conducting properties of the ceramic oxide charge itself. Nevertheless, such entering hard dies have been used in small scale laboratory work with sleeves and plungers made of dense aluminum or zirconium oxide. In such dies tensile stresses caused during pressing have to be resisted by the ceramic die sleeve, which from the foregoing is undesirable.

Entering hard dies have been built of dense graphite for hot pressing work. However, at elevated temperature graphite becomes an active reducing agent on ferrites, titanates and other reducible compounds. Such a reducing action will cause severe changes in the chemical and crystallographic structure and uniformity of the material which becomes destroyed by reduction to lower forms of oxides. Graphite is, therefore, ruled out as a die material for hot pressing of ferrite. Similar difficulties are caused by carbides. For another type of hard die see, for example, Patents Nos. 2,941,241 and 2,941,243.

These various conditions and principles were met in this invention through development of the concept of a non-entering soft die for hot pressing of ferrite and similar materials. The terminology has been chosen to indicate the die sleeve is made from a soft, brittle ceramic foam with large air cell volume of 50 to 87 percent. Such a foam is sensitive to compression and is non-elastic. It will, under compression, assume a new permanent volume by break down of its ceramic cell walls. Foams of suitable type can be deformed at ambient temperature by pressure of approximately 70–500 p.s.i. They can be produced by various methods, such as foaming, incorporating volatile or combustible granules in a plastic ceramic mass, or cementing together lightweight bubbles of alumina, zirconia, etc. These materials are heat treated to produce a rigid foam.

Some of the commercially available insulating type fire brick are ceramic foams suitable for construction of soft dies, provided the temperature range for the brock material and its thermal or thermo-chemical stability is not exceeded. K–23 insulating brick has been used successfully in pressure sintering according to the present method. Examples of other soft die material are illustrated in FIG. 3.

When needed, the air cell volume of a foam can be increased by mechanical means such as by providing evenly spaced holes or cells without destroying its rigidity and cohesion. In this manner, for example, by drilling holes, adjustments in the pressure resistance and total volume reduction of a given foam can be readily accomplished.

The hot pressing conditions may vary somewhat with certain dimensional variables, of die, sleeve and charge, which indicates that some standardization is in order. The charge should take a volume reduction of less than 1:2 at hot pressing temperature, or only about ½ of the maximum volume reduction for the sleeve. Efficient utilization of pressure under these conditions is satisfactory. Although some lateral spreading of the charge takes place on occasion, shape retention in general is satisfactory. Spreading takes place during the initial stage of pressing when the larger voids in the charge and sleeve become filled. Rigidity of charge and sleeve increase as pressing proceeds, because internal friction in both increases and particle movement becomes confined to densification in the direction of applied pressure. During pressing sleeve 14 is destroyed and must be replaced. The expense for sleeve 14 is minor compared with the value of the material produced in the hot press.

Pressure, of course, is an external factor which can be regulated at will, provided the pressure supply is sufficiently large. A portion of the applied pressure is used in the compression of the ceramic foam sleeve, but this being reproducible and readily regulated through a wide choice of readily fabricated ceramic foams, its compression in any of its functions as hot pressing die has not caused any difficulties. Uniformly dense ingots are readily produced.

The design of the pressure and heating platens 38 and 40 is of major importance. As heat and pressure transmitting members of the hot pressing apparatus, platens 38 and 40 are subjected to equal or higher temperature and pressure effects as the charge. The maximum operating conditions for this hot pressing apparatus depend on the quality of materials for the platens and how these platens are assembled and used. Of concern is the possibility of undesirable thermochemical interaction taking place between various materials of the platens 34 and 36, the entire die and charge 18, causing fusion, slagging, adhesion and electrical short circuiting. Such interactions are minimized by using oxides of a high order of chemical stability as construction materials, such as alumina, mullite or zirconia. These materials happen to have, also, a high order of desirable compressive strength.

For further limiting interactions thin layers of alumina or zirconia powder are applied as parting materials between dissimilar parts, such as between charge 18, platens 34 and 36 and sleeve 14.

The pressure head of platens 38 and 40 is a ¾ inch plate of dense, 99% alumina. This is backed up by high density, pressure resistant mullite castable refractory 24 and 26 about 6 inches in thickness for suitable heat insulation. These refractory parts are encased in high strength steel shells 10 and 12 which have to withstand all lateral pressures and have to keep the refractory in place with a minimum of movement. Any deformation of steel shells 10 and 12 under pressure invites cracking and possible destruction of the refractory parts; it may also cause failure of the heaters.

The top heating elements 37 and 38 and the bottom heating elements 39 and 40 are metallic wires of platinum-rhodium alloy for temperatures between 1350 and 1500° C., or nickel-chromium-aluminum (kanthal A) for temperatures up to about 1350° C. These wires are embedded in narrow grooves on the outside faces of the platens. For use at the lower temperatures the wires may be cast into a plate of mullite castable refractory; such a heater is designed for easy replacement.

The temperature in platens 34 and 36 is measured and controlled by platinum-platinum/rhodium thermocouple. Its junction is embedded in one of the platens.

In the overall design of the die the dimensions of platens 34 and 36 and soft die sleeve 14 are so chosen that the platens reach over most of the surface of sleeve 14. In this manner the die becomes, to a large extent, independent of the heat insulating capabilities of the soft die material 14, reducing the temperature gradient to a minimum and providing high heat uniformity in the charge. The heat flow away from charge 18 is then effectively blocked. A similar heat block is applied to platens 34 and 36 for temperatures in excess of 1350° C. by providing the second set of heaters 38 and 40 behind the pressure head. The incorporation of this method of blocking heat flow from the charge has provided an effective means for obtaining a good temperature uniformity.

In the assembly and the operation of the suggested apparatus, the position and movement of platens 34 and 36 and sleeve 14 are related to each other through guide pins 20 and 22 extending upward from frame 42 of the lower platen, passing through the metal frame 16 of the sleeve and through a corresponding set of guide holes in frame 44 of the upper platen 10. In this manner the hot pressing apparatus need not be mounted on the press, but becomes an independent unit which can be moved in and out of the press for charging and discharging.

From the foregoing the construction, assembly and function of the apparatus will be readily understood. The following examples provide some further detail on hot pressing of ceramic oxide compositions, according to the present invention.

*Example I.*—In the preparation of a magnesium-manganese ferrite, the constituent oxides (for example, $MnO_2$, $Mn_2O_3$, $MgO$, $Fe_2O_3$ or $Al_2O_3$) are weighed according to a given formula, then wet mixed in a ball mill or high speed blender; the resulting slip is dried and then calcined at about 1000° C. to react the constituent oxides and to form the ferrite. This calcine is ball milled in water to the particle size of ½ to 1 micron, the resulting slip is dried and the powder is formed in an isostatic press into a cake of dimensions close to those of the die cavity. Because the ferrite powder is very reactive the cake or charge 18 is coated with a thin layer of aluminum oxide powder. Likewise, the interface between sleeve 14 and platens 34 and 36 is also coated with alumina powder to prevent adhesion.

Soft-die sleeve 14 can in this case be made of K–23 insulating brick. Charge 18 is inserted into die cavity 28, sections 10 and 12 and frame 16 assembled on guide pins 20 and 22 and the press is closed. The heating rate may be 100° to 200° C. per hour, which is reduced to about 25° to 50° C. per hour when the final temperature of about 1280° C. is approached. The retention time at this temperature is about 15 minutes, the pressure about 10 t.s.i.; a dense pore-free ingot results. The final temperature and pressure is higher if part of the iron oxide in this ferrite is substituted by aluminum oxide which tends to increase refractoriness. The crystal grain size is usually a uniform 1 to 2 microns; density is near theoretical.

*Example II.*—Charge 18 need not always be a pre-reacted material. In the preparation of a stoichiometric nickel ferrite the steps of weighing the components (such as NiO, $Ni_2O_3$ and $Fe_2O_3$) blending in water, drying, pressing the powder into a cake are the same as in Example I, but the presintering step is omitted. The application of aluminum oxide powder is also the same, heating and pressing are the same, but the maximum temperature is about 1200° C. The ultimate particle size of the nickel and iron oxides is between 0.25 and 0.025 micron, the crystal size in the hot pressed ingot averages about 1 micron, the density is near theoretical. Because impurities have considerable effect on the hot pressed material, only high purity, reagent grade oxide materials should be used.

*Example III.*—A magnesium titanate, for example, the meta-titanate, $MgTiO_3$ (or components such as $MgO$, $TiO_2$ and $2MgSiO_2$), is processed in the same manner as indicated in Example I, but the hot pressing temperature is increased to 1425° C. using platinum heating elements 38 and 40 and the pressure is increased to 15 t.s.i. on charge 18. A sleeve 14 of "bubble" alumina is used to resist the higher temperature and a parting layer of zirconium oxide powder replaces aluminum oxide powder.

*Example IV.*—Yttrium iron garnet with aluminum oxide substitution requires a hot pressing temperature of about 1450° C. and a pressure of 15 t.s.i. on the charge. The mixture of oxides is pre-reacted at about 1200° C. and the sinter ball milled to ½ to 1 micron. The hot pressed ingot has a near theoretical density, the material is free from pores, takes an extraordinary high-gloss polish with a bluish black luster, comparable to single crystal material. The grain size averages 1 micron.

Examples of other materials which may be hot pressed between 900 and 1500° C. are the following:

(1) FERROMAGNETICS (a) *Ferrite—Spinel type* $(M^2)O.Fe_2O_3$ *(divalent M)*

Simple and complex ferrite as crystalline solutions with substitutions of MO, such as (Mg, Li, Mn, $Fe^2$, Ni, Co, Zn, Cd, etc.) and in part substitutions of $Fe_2O_3$ by $Al_2O_3$, $Cr_2O_3$, $Ga_2O_3$, $In_2O_3$, etc.

(b) *Ferrite—Garnet type* $3(M^3)_2O_3.Fe_2O_3$ *(trivalent Me)*

Where $(M^3)_2O_3$ is represented by $Y_2O_3$, $YF_3$, $Gd_2O_3$ and various other rare earth oxides and fluorides, $Fe_2O_3$ may be substituted in part by $Al_2O_3$, $Ga_2O_3$, $Cr_2O_3$, etc., or substitutions by $Ca-Bi_2O_3$, $Ca-V_2O_3$, etc.

(c) *Ferrite—hexagonal (magneto plumbite) type* $BaO.Fe_2O_3$ *or barium fluorferrite*

Barium may be substituted by numerous other divalent metaloxides, such as PbO, NiO, CoO, MgO, ZnO, and form crystalline solutions of the respective ferrites.

(2) FERRO-ELECTRICS (a) Titanates and mixed titanates of magnesium, lithium, calcium, strontium, barium, zinc, lead, bismuth, etc. Further: zirconates, stannates, tantalates, niobates, vanadates, molybdates, tungstates by themselves or as crystalline solutions, also with titanates, zirconyl pyrophosphate, gallates, germanates, etc. Single oxides such as NiO, CoO, MnO, etc., calcium fluoride and other alkaline earth or rare earth fluorides, singly or in crystalline solid solution; alkaline earth fluorides with rare earth dopants for Laser materials.

(b) Silicates, such as fosterite ($2MgO.SiO_2$), clinoenstatite ($MgO.SiO_2$), cordierite ($2MgO_2Al_2O_3.5SiO_2$), pyrope ($3MgO.Al_2O_3.3SiO_2$) and others. Fluor phogopite mica, such as barium fluor mica with second phase additions of $TiO_2$, $SrTiO_3$, $BaTiO_3$ for adjustment of dielectric constant, fluor amphibole and the like.

The intrinsic microwave properties of hot pressed materials: Saturation moment ($4\pi M_s$), g-effective, dielectric loss tangent ($\tan = \epsilon''/\epsilon'$), line width ($\Delta H$ oe) and Curie temperature are unchanged within narrow limits, while the dielectric constant ($\epsilon'$) is usually slightly higher, when compared with conventionally produced materials. The permeability is generally improved by hot pressing; the coercive force is increased due to smaller crystals.

A very desirable and significant property of small grain hot pressed ferrite is its vastly improved control over spin wave effects at high power levels and a consequent increase in the power handling capabilities of ferrite devices. This improvement becomes noticeable at a crystal size of about 7 microns and non-linearity of the loss curve is steadily improved until the power handling capacity becomes about 10 times at a grain size of ½ to 1 micron. These developments were made possible for the first time by the apparatus and method of this invention which provided low loss, fine grain and pore-free materials in suitable sizes for high power devices.

At U.H. frequencies losses due to domain wall motion can be eliminated by decreasing crystallite size to domain size, which can be achieved by hot pressing ferrite powder of 0.1 micron particle size. Powders of such small particle size can be readily obtained, for example, by chemical precipitation from aqueous solutions of nitrates or chlorides and subsequent reaction of the constituents at relatively low temperature to produce a ferrite or titanate grain of approximately 0.1 micron. The procedure of hot-pressing is the same as indicated.

The reproducibility of properties by this hot pressing method is predicated on proper instrumentation for the heating cycle. Most of the properties of these materials vary within a narrow range of ±5 percent. Persons skilled in the art will have no difficulty in adjusting details to meet their specific requirements. Such variations are not considered departures from the basic concept and substance of invention.

What is claimed is:

1. A die assembly for forming large (1 x 2 x 5", for example) pieces of ceramic material on a production line basis, said assembly comprising:
- a die sleeve, said die sleeve having a given height and upper and lower surfaces with a cavity in at least one of said surfaces for receiving said ceramic material, said die sleeve being composed of a rigid, brittle ceramic foam having an air cell volume of 50 to about 87%.
- heating means disposed adjacent to and in essentially direct thermal contact with said ceramic material and said upper and lower surfaces to maintain said ceramic material and at least a portion of said die sleeve at about the same temperature; and
- non-entering means for applying pressure to said surfaces and said charge to rupture and collapse said die sleeve around said charge to cause said die sleeve to assume a new volume by breakdown of its ceramic cell walls.

2. The die assembly as claimed in claim 1 wherein said ceramic foam is deformable at ambient temperatures by pressures of about 70 to about 500 p.s.i.

3. The die assembly as claimed in claim 1 wherein said non-entering means covers a major portion of the said upper and lower surfaces.

4. A die assembly as claimed in claim 1 wherein said heating means includes resistance wires, said resistance wires being disposed adjacent to a portion of the said surfaces.

5. The die assembly as claimed in claim 4 wherein said resistance wires are disposed adjacent the surface of said non-entering means for applying pressure.

6. Apparatus as in claim 4 where said heating means includes further resistance wires disposed away from said surfaces and maintained at about the same temperatures as said resistance wires adjacent the said surfaces to prevent heat flow away from said charge.

7. Apparatus as in claim 1 where at least a portion of the surface of said die sleeve is directly exposed to the atmosphere, to facilitate the passage of oxygen to oxidize various impurities in said charge and improve the electrical properties of the resulting ingot.

8. The die assembly as claimed in claim 1 wherein said non-entering means cause said die sleeve to generally maintain the shape of said ceramic material.

References Cited

UNITED STATES PATENTS

| | | |
|---|---|---|
| 2,892,955 | 6/1959 | Gulton. |
| 2,941,241 | 6/1960 | Strong. |
| 2,990,602 | 7/1961 | Brandmayr _____ 264—332 |
| 3,178,773 | 4/1965 | Custers. |

OTHER REFERENCES

The Review of Scientific Instruments, pp. 267–269, 271 and 272, vol. 29, No. 4, by Tracy Hall, April 1958.

J. HOWARD FLINT, JR., *Primary Examiner.*